US010174562B2

(12) United States Patent
DiGiovanni et al.

(10) Patent No.: US 10,174,562 B2
(45) Date of Patent: Jan. 8, 2019

(54) METHODS OF FORMING POLYCRYSTALLINE ELEMENTS FROM BROWN POLYCRYSTALLINE TABLES

(71) Applicant: Baker Hughes Incorporated, Houston, TX (US)

(72) Inventors: Anthony A. DiGiovanni, Houston, TX (US); Nicholas J. Lyons, Houston, TX (US); Derek L. Nelms, Midland, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 115 days.

(21) Appl. No.: 15/235,588

(22) Filed: Aug. 12, 2016

(65) Prior Publication Data

US 2016/0348447 A1    Dec. 1, 2016

Related U.S. Application Data

(62) Division of application No. 14/512,651, filed on Oct. 13, 2014, now Pat. No. 9,440,333, which is a division
(Continued)

(51) Int. Cl.
*B24D 3/00* (2006.01)
*B24D 18/00* (2006.01)
(Continued)

(52) U.S. Cl.
CPC ............ *E21B 10/5735* (2013.01); *B22F 7/08* (2013.01); *B24D 3/14* (2013.01); *B24D 18/0009* (2013.01);
(Continued)

(58) Field of Classification Search
USPC ................... 51/307, 293, 296, 309
See application file for complete search history.

(56) References Cited

U.S. PATENT DOCUMENTS 4,871,337 A   10/1989   Harris
4,871,377 A   10/1989   Frushour
(Continued)

FOREIGN PATENT DOCUMENTS

WO   2009018427 A1   2/2009

OTHER PUBLICATIONS

European Office Action for European Application No. 12754987.1 dated Mar. 22, 2017, 5 pages.
(Continued)

*Primary Examiner* — James E McDonough
(74) *Attorney, Agent, or Firm* — TraskBritt

(57) ABSTRACT

Methods of forming a polycrystalline table may involve disposing a plurality of particles comprising a superabrasive material, a substrate comprising a hard material, and a catalyst material in a mold. The plurality of particles may be partially sintered in the presence of the catalyst material to form a brown polycrystalline table having a first permeability attached to an end of the substrate. The substrate may be removed from the brown polycrystalline table and catalyst material may be removed from the brown polycrystalline table. The brown polycrystalline table may then be fully sintered to form a polycrystalline table having a reduced, second permeability. Intermediate structures formed during a process of attaching a polycrystalline table to a substrate may include a substantially fully leached brown polycrystalline table. The substantially fully leached brown polycrystalline table may include a plurality of interbonded grains of a superabrasive material.

17 Claims, 6 Drawing Sheets

Related U.S. Application Data of application No. 13/040,861, filed on Mar. 4, 2011, now Pat. No. 8,858,662.

(51) Int. Cl.

| | |
|---|---|
| *E21B 10/573* | (2006.01) |
| *B24D 99/00* | (2010.01) |
| *C04B 35/52* | (2006.01) |
| *C22C 26/00* | (2006.01) |
| *C04B 35/58* | (2006.01) |
| *C04B 35/5831* | (2006.01) |
| *C04B 35/63* | (2006.01) |
| *C04B 35/638* | (2006.01) |
| *C04B 35/645* | (2006.01) |
| *C04B 37/00* | (2006.01) |
| *F16C 33/04* | (2006.01) |
| *B24D 3/14* | (2006.01) |
| *B22F 7/08* | (2006.01) |
| *C04B 35/583* | (2006.01) |
| *C04B 37/02* | (2006.01) |
| *E21B 10/50* | (2006.01) |
| *E21B 10/55* | (2006.01) |
| *E21B 10/567* | (2006.01) |
| *B24D 11/00* | (2006.01) |
| *C09K 3/14* | (2006.01) |
| *B24D 3/02* | (2006.01) |
| *B22F 5/00* | (2006.01) |

(52) U.S. Cl.
CPC ............ *B24D 99/005* (2013.01); *C04B 35/52* (2013.01); *C04B 35/58* (2013.01); *C04B 35/583* (2013.01); *C04B 35/5831* (2013.01); *C04B 35/6303* (2013.01); *C04B 35/638* (2013.01); *C04B 35/645* (2013.01); *C04B 37/001* (2013.01); *C04B 37/021* (2013.01); *C22C 26/00* (2013.01); *E21B 10/50* (2013.01); *E21B 10/55* (2013.01); *E21B 10/5673* (2013.01); *F16C 33/043* (2013.01); *B22F 2005/001* (2013.01); *C04B 2235/386* (2013.01); *C04B 2235/3856* (2013.01); *C04B 2235/405* (2013.01); *C04B 2235/427* (2013.01); *C04B 2235/602* (2013.01); *C04B 2235/608* (2013.01); *C04B 2235/61* (2013.01); *C04B 2235/661* (2013.01); *C04B 2237/36* (2013.01); *C04B 2237/361* (2013.01); *C04B 2237/363* (2013.01); *C04B 2237/401* (2013.01); *C22C 2204/00* (2013.01)

(56) References Cited

U.S. PATENT DOCUMENTS

| | | | |
|---|---|---|---|
| 5,954,147 A | 9/1999 | Overstreet et al. | |
| 7,753,143 B1 | 7/2010 | Miess et al. | |
| 7,845,438 B1 | 12/2010 | Vail et al. | |
| 7,942,219 B2 | 5/2011 | Keshavan et al. | |
| 8,858,662 B2 | 10/2014 | DiGiovanni et al. | |
| 2005/0210755 A1* | 9/2005 | Cho | B21C 3/025 51/293 |
| 2008/0206576 A1* | 8/2008 | Qian | B24D 3/10 428/446 |
| 2009/0133938 A1* | 5/2009 | Hall | C22C 26/00 175/434 |
| 2010/0115855 A1 | 5/2010 | Middlemiss | |
| 2010/0181117 A1 | 7/2010 | Scott | |
| 2010/0243336 A1 | 9/2010 | Dourfaye et al. | |
| 2010/0243337 A1 | 9/2010 | Scott | |
| 2011/0023375 A1 | 2/2011 | Sani et al. | |
| 2011/0036643 A1 | 2/2011 | Belnap et al. | |
| 2011/0088950 A1 | 4/2011 | Scott et al. | |
| 2012/0085585 A1 | 4/2012 | Scott et al. | |
| 2012/0222363 A1 | 9/2012 | DiGiovanni et al. | |
| 2012/0222364 A1 | 9/2012 | Lyons et al. | |
| 2016/0151889 A1 | 6/2016 | DiGiovanni et al. | |

OTHER PUBLICATIONS

Canadian Office Action for Canadian Application No. 2,828,868 dated May 27, 2015, 3 pages.
Chinese Office Action for Chinese Application No. 201280011629.5 dated Sep. 25, 2015, 20 pages.
European Communication and Search Report for European Application No. 12754987 dated Jul. 24, 2014, 8 pages.
International Preliminary Report on Patentability for International Application No. PCT/US2012/027074 dated Sep. 10, 2013, 6 pages.
International Search Report for International Application No. PCT/US2012/027074 dated Sep. 25, 2012, 3 pages.
International Written Opinion for International Application No. PCT/US2012/027074 dated Sep. 25, 2012, 4 pages.

* cited by examiner

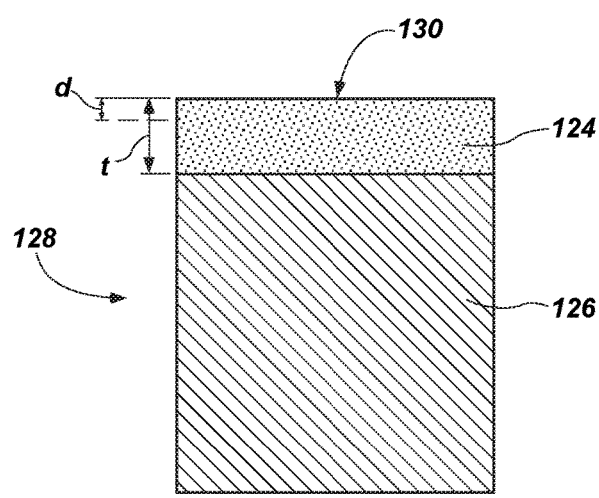
FIG. 5
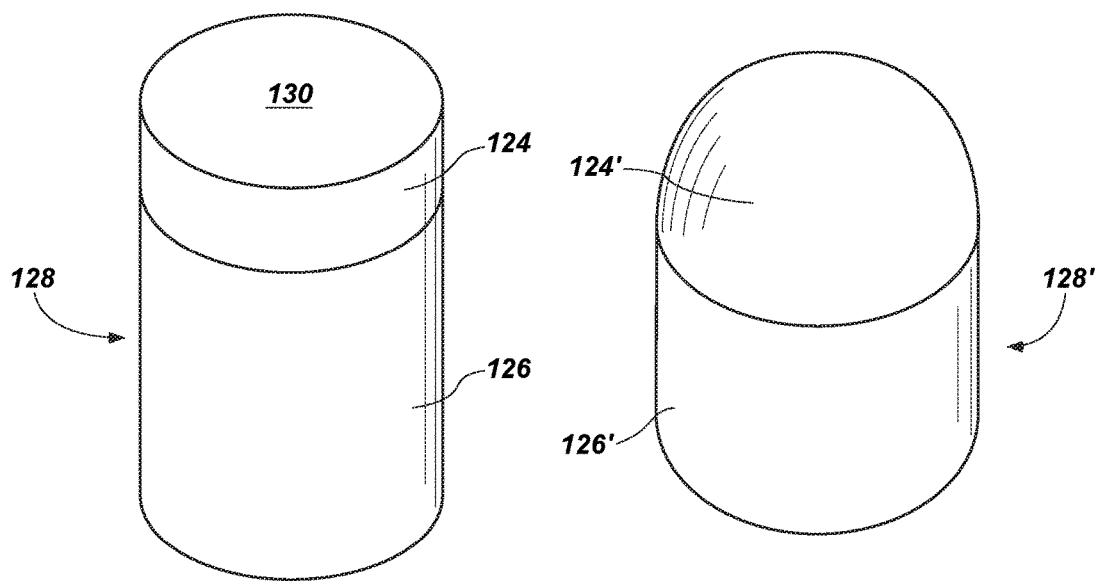
FIG. 6
FIG. 7

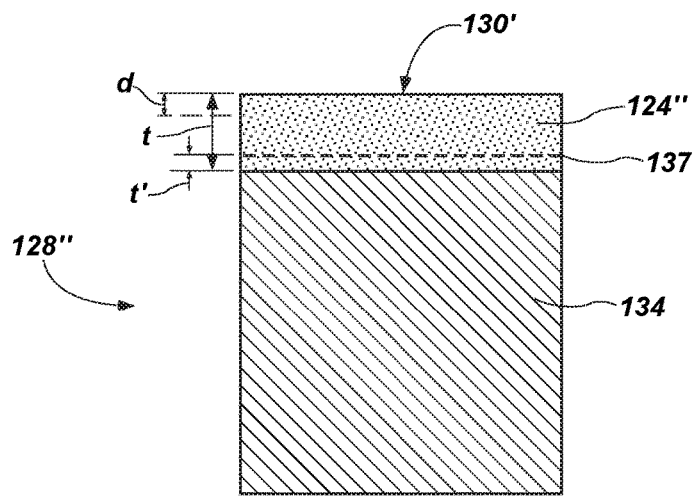
FIG. 9
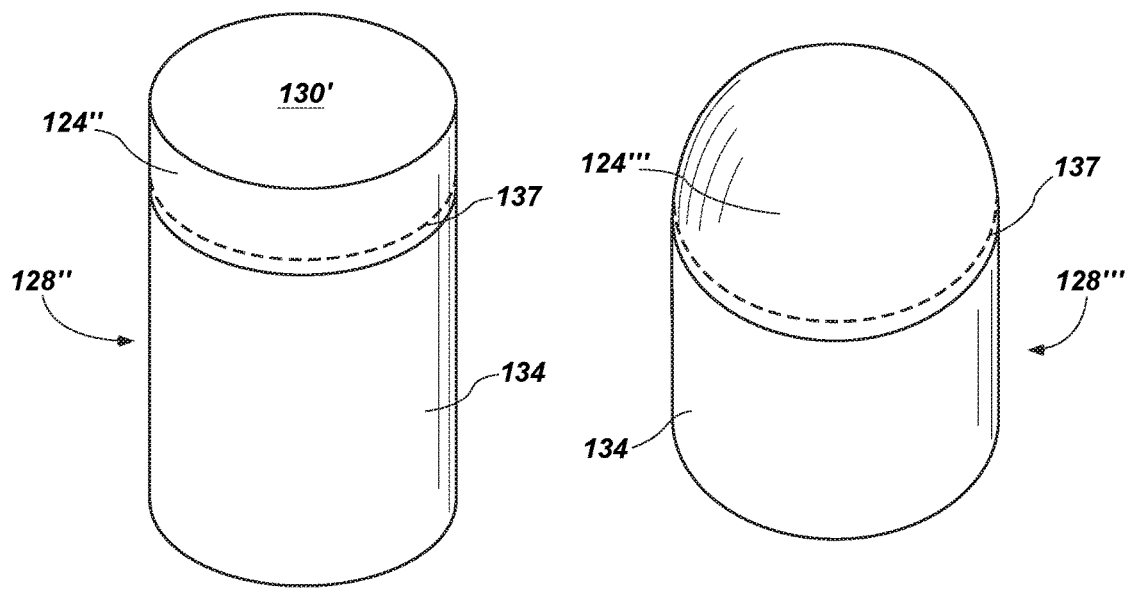
FIG. 10
FIG. 11

METHODS OF FORMING POLYCRYSTALLINE ELEMENTS FROM BROWN POLYCRYSTALLINE TABLES

CROSS-REFERENCE TO RELATED APPLICATIONS

This application is a divisional of U.S. patent application Ser. No. 14/512,651, filed Oct. 13, 2014, now U.S. Pat. No. 9,440,333, issued Sep. 13, 2016, which is a divisional of U.S. patent application Ser. No. 13/040,861, filed Mar. 4, 2011, now U.S. Pat. No. 8,858,662, issued Oct. 14, 2014, the disclosure of each of which is incorporated herein in its entirety by this reference.

FIELD

Embodiments of the present invention relate generally to methods of forming polycrystalline tables of superabrasive material, methods of forming superabrasive polycrystalline elements, and related structures. Specifically, embodiments of the disclosure relate to methods for attaching fully leached or substantially fully leached polycrystalline tables of superabrasive material to substrates to form polycrystalline elements, and intermediate structures related thereto.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

The cutting elements used in such earth-boring tools often include polycrystalline diamond compact (often referred to as "PDC") cutting elements, also termed "cutters," which are cutting elements that include a polycrystalline diamond (PCD) material, which may be characterized as a superabrasive or superhard material. Such polycrystalline diamond materials are formed by sintering and bonding together relatively small synthetic, natural, or a combination of synthetic and natural diamond grains or crystals, termed "grit," under conditions of high temperature and high pressure in the presence of a catalyst, such as, for example, cobalt, iron, nickel, or alloys and mixtures thereof, to form a layer of polycrystalline diamond material, also called a diamond table. These processes are often referred to as high-temperature/high-pressure ("HTHP") processes. The cutting element substrate may comprise a cermet material, i.e., a ceramic-metal composite material, such as, for example, cobalt-cemented tungsten carbide. In some instances, the polycrystalline diamond table may be formed on the cutting element, for example, during the HTHP sintering process. In such instances, cobalt or other catalyst material in the cutting element substrate may be swept into the diamond grains or crystals during sintering and serve as a catalyst material for forming a diamond table from the diamond grains or crystals. Powdered catalyst material may also be mixed with the diamond grains or crystals prior to sintering the grains or crystals together in an HTHP process. In other methods, however, the diamond table may be formed separately from the cutting element substrate and subsequently attached thereto.

To reduce problems associated with differences in thermal expansion and chemical breakdown of the diamond crystals in PDC cutting elements, "thermally stable" polycrystalline diamond compacts (which are also known as thermally stable products or "TSPs") have been developed. Such a thermally stable polycrystalline diamond compact may be formed by leaching catalyst material out from interstitial spaces between the interbonded grains in the diamond table. However, a conventional diamond table may require up to five weeks or even longer to leach substantially all the catalyst material from the interstitial spaces between interbonded grains, slowing down production.

BRIEF SUMMARY

In some embodiments, the disclosure includes methods of forming a polycrystalline table comprising disposing a plurality of particles comprising a superabrasive material, a substrate comprising a hard material, and a catalyst material in a mold. The plurality of particles is partially sintered in the presence of the catalyst material to form a brown polycrystalline table having a first permeability attached to an end of the substrate. The substrate is removed from the brown polycrystalline table and the catalyst material is removed from the brown polycrystalline table. The brown polycrystalline table is then fully sintered to form a polycrystalline table having a reduced, second permeability.

In other embodiments, the disclosure includes methods of forming a polycrystalline element, comprising partially sintering a plurality of particles comprising a superabrasive material in the presence of a catalyst material and a substrate comprising a hard material to form a brown polycrystalline table attached to an end of the substrate. The substrate is removed and the catalyst material is leached from the brown polycrystalline table. The brown polycrystalline table is then disposed on another substrate. The brown polycrystalline table is fully sintered in the presence of another, different catalyst material and the other substrate to form a polycrystalline table attached to an end of the other substrate.

In additional embodiments, the disclosure includes intermediate structures formed during a process of attaching a polycrystalline table to a substrate comprising a substantially fully leached brown polycrystalline table. The substantially fully leached brown polycrystalline table comprises a plurality of interbonded grains of a superabrasive material.

BRIEF DESCRIPTION OF THE SEVERAL VIEWS OF THE DRAWINGS

While the specification concludes with claims particularly pointing out and distinctly claiming that which is regarded as the present invention, various features and advantages of embodiments of this invention may be more readily ascertained from the following description of embodiments of the invention when read in conjunction with the accompanying drawings, in which:

FIG. 5 illustrates a schematic view of a fully sintered polycrystalline table attached to a substrate;

FIG. 6 depicts a perspective view of a cutting element formed by the process illustrated in FIGS. 1 through 5;

FIG. 7 is a perspective view of another cutting element formed by the process illustrated in FIGS. 1 through 5;

FIG. 9 illustrates a schematic view of a fully formed polycrystalline table attached to a substrate.

FIG. 10 is a perspective view of a cutting element formed by the process illustrated in FIGS. 8A, 8B, and 9;

FIG. 11 is a perspective view of another cutting element formed by the process illustrated in FIGS. 8A, 8B, and 9.

DETAILED DESCRIPTION

Figure 1:
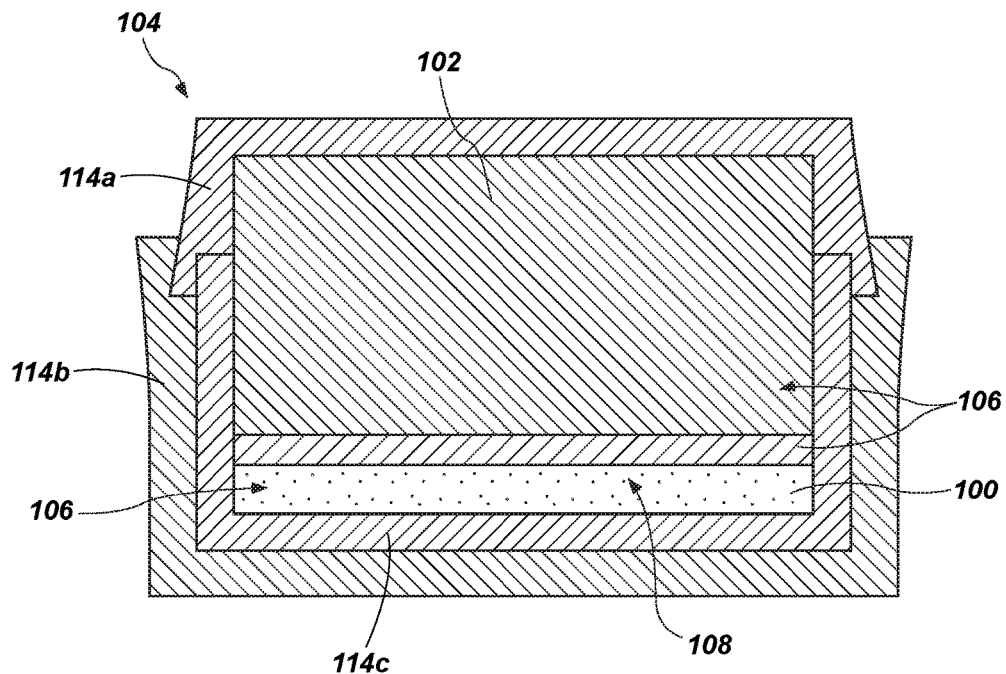
FIG. 1 is a schematic view of a first plurality of particles and a second plurality of particles disposed in a mold in a process for attaching a polycrystalline table to a substrate.

The illustrations presented herein are not meant to be actual views of any particular earth-boring tool, cutting element, or bearing, but are merely idealized representations that are employed to describe the embodiments of the disclosure. Additionally, elements common between figures may retain the same or similar numerical designation.

The terms "earth-boring tool" and "earth-boring drill bit," as used herein, mean and include any type of bit or tool used for drilling during the formation or enlargement of a wellbore in a subterranean formation and include, for example, fixed-cutter bits, roller cone bits, percussion bits, core bits, eccentric bits, bicenter bits, reamers, mills, drag bits, hybrid bits, and other drilling bits and tools known in the art.

As used herein, the term "superabrasive material" means and includes any material having a Knoop hardness value of about 3,000 $Kg_f/mm^2$ (29,420 MPa) or more. Superabrasive materials include, for example, diamond and cubic boron nitride. Superabrasive materials may also be characterized as "superhard" materials.

As used herein, the term "polycrystalline table" means and includes any structure comprising a plurality of grains (i.e., crystals) of material (e.g., grains of superabrasive material) that are bonded directly together by inter-granular bonds. The crystal structures of the individual grains of the material may be randomly oriented in space within the polycrystalline material.

As used herein, the terms "inter-granular bond" and "interbonded" mean and include any direct atomic bond (e.g., covalent, metallic, etc.) between atoms in adjacent grains of superabrasive material.

The term "green" as used herein means unsintered.

The term "green part" as used herein means an unsintered structure comprising a plurality of discrete particles, which may be held together by a binder material, the unsintered structure having a size and shape allowing the formation of a part or component suitable for use in earth-boring applications from the structure by subsequent manufacturing processes including, but not limited to, machining and densification.

The term "brown" as used herein means partially sintered.

The terms "brown part" and "brown polycrystalline table" as used herein mean a partially sintered structure comprising a plurality of particles, at least some of which have partially grown together to provide at least partial bonding between adjacent particles, the structure having a size and shape allowing the formation of a part suitable for use in earth-boring applications from the structure by subsequent manufacturing processes including, but not limited to, machining and further densification. A brown part may be formed by, for example, partially sintering a green part.

The term "sintering" as used herein means temperature driven mass transport, which may include densification and/or coarsening of a particulate component, and typically involves removal of at least a portion of the pores between the starting particles (accompanied by shrinkage) combined with coalescence and bonding between adjacent particles.

As used herein, the term "material composition" means the chemical composition and microstructure of a material. In other words, materials having the same chemical composition but a different microstructure are considered to have different material compositions.

As used herein, the term "tungsten carbide" means any material composition that contains chemical compounds of tungsten and carbon, such as, for example, WC, $W_2C$, and combinations of WC and $W_2C$. Tungsten carbide includes, for example, cast tungsten carbide, sintered tungsten carbide, and macrocrystalline tungsten carbide.

Referring to FIG. 1, a schematic view of a plurality of superabrasive material particles 100 and a substrate 102 disposed in a mold 104 in a process for forming and concurrently attaching a polycrystalline table to the substrate 102 is shown. The plurality of particles 100 may be disposed in the mold 104 and may comprise a superabrasive material, such as, for example, synthetic diamond, natural diamond, a combination of synthetic diamond and natural diamond, cubic boron nitride, carbon nitrides, or other superabrasive materials known in the art. The plurality of particles 100 may comprise a mono-modal size distribution or a multi-modal (e.g., bi-modal, tri-modal, etc.) size distribution.

The substrate 102 may, likewise, be disposed in the mold 104 and may comprise a pre-sintered part. The substrate 102 may comprise a hard material suitable for use in earth-boring applications. For example, the hard material may comprise a ceramic-metal composite material (i.e., a "cermet" material) comprising a plurality of hard ceramic particles dispersed throughout a metal matrix material. The hard ceramic particles may comprise carbides, nitrides, oxides, and borides (including boron carbide ($B_4C$)). More specifically, the hard ceramic particles may comprise carbides and borides made from elements such as W, Ti, Mo, Nb, V, Hf, Ta, Cr, Zr, Al, and Si. By way of example and not limitation, materials that may be used to form hard ceramic particles include tungsten carbide, titanium carbide (TiC), tantalum carbide (TaC), titanium diboride ($TiB_2$), chromium carbides, titanium nitride (TiN), aluminium oxide ($Al_2O_3$), aluminium nitride (AlN), and silicon carbide (SiC). The metal matrix material of the ceramic-metal composite material may include, for example, cobalt-based, iron-based, nickel-based, iron- and nickel-based, cobalt- and nickel-based, and iron- and cobalt-based alloys. The matrix material may also be selected from commercially pure elements, such as, for example, cobalt, iron, and nickel. As a specific, non-limiting example, the hard material may comprise a plurality of tungsten carbide particles in a cobalt matrix.

The plurality of particles 100 may be provided as one or more strata or layers on the substrate 102 in the mold 104. For example, the plurality of particles 100 is shown as a layer of particles distributed on an end of the substrate 102 with the substrate 102 being positioned above the first plurality of particles 100 in the mold 104. In other embodiments, the first plurality of particles 100 may be positioned on the substrate 102 in the mold 104. If more than one strata or layer of particles is employed, various layers may have a different average particle size, or a mix (bi-modal, tri-modal, etc.) of average particle sizes.

A catalyst material 106 may also be provided in the mold 104. The catalyst material 106 may comprise, for example, cobalt, iron, nickel, cobalt-based, iron-based, nickel-based, iron- and nickel-based, cobalt- and nickel-based, and iron- and cobalt-based alloys, or other catalyst materials known in the art. The catalyst material 106 may comprise a catalyst powder distributed, for example, among the plurality of particles 100. Alternatively, an element such as a disc, foil, or mesh of catalyst material 106 may be disposed between the plurality of particles 100 and the substrate 102 in the mold 104. Further, catalyst material 106 may be disposed in (i.e., incorporated as a constituent of) the substrate 102, such as, for example, where the substrate 102 comprises a cermet material and the metal matrix comprises a catalyst material 106. Another plurality of particles 108 comprising a material removable by a leaching process may also be optionally provided in the mold 104. For example, the another plurality of particles 108 may be distributed among the first plurality of particles 100 in the mold 104.

The mold 104 may include one or more generally cup-shaped members, such as the cup-shaped member 114a, the cup-shaped member 114b, and the cup-shaped member 114c, which may be assembled and swaged and/or welded together to form the mold 104. The first plurality of particles 100, the substrate 102, the catalyst material 106, and the optional other plurality of particles 108 may be disposed within the inner cup-shaped member 114c, as shown in FIG. 1, which has a circular end wall and a generally cylindrical lateral side wall extending perpendicularly from the circular end wall, such that the inner cup-shaped member 114c is generally cylindrical and includes a first closed end and a second, opposite open end.

The plurality of particles 100, the substrate 102, and the optional another plurality of particles 108 may then be subjected to a sintering process in the presence of the catalyst material 106. For example, an HTHP process may be used to partially sinter the first plurality of particles 100. The peak temperature used in the HTHP process may exceed 1,320° C. and may be, for example, about 1,400° C. The peak pressure used in the HTHP process may be at least about 5 GPa. The plurality of particles 100, the substrate 102, the catalyst material 106, and the optional another plurality of particles 108 in the mold 104 may remain at peak pressure and temperature for a time sufficient to enable grain growth and interbonding among the plurality of particles 100 while the plurality of particles 100 remains less than fully sintered. For example, the plurality of particles 100, the substrate 102, the catalyst material 106, and the optional another plurality of particles 108 in the mold 104 may remain at peak pressure and temperature for less than about 5 minutes.

Figure 2:
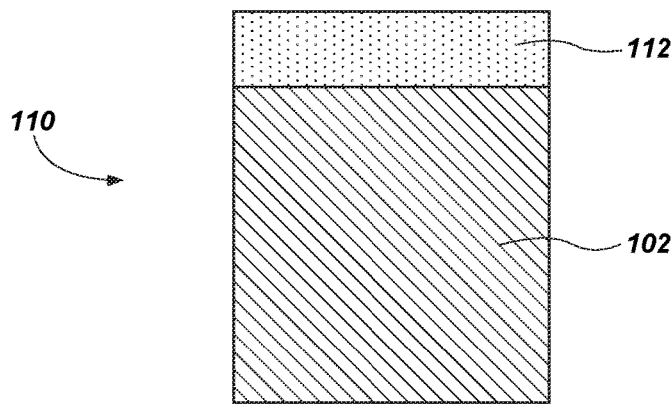
FIG. 2 illustrates a schematic view of a first intermediate structure formed in a process for attaching a polycrystalline table to a substrate.

Referring to FIG. 2, a first intermediate structure 110 formed in a process for attaching a polycrystalline table to a substrate is shown. The first intermediate structure 110 may include a brown polycrystalline table 112. The brown polycrystalline table 112 may be partially sintered. Thus, at least some grains of superhard material may have grown together and formed intergranular bonds. In some embodiments, grain growth of the grains of superhard material may be minimized. For example, the grains of superhard material may exhibit a grain growth of less than 5 μm. The first intermediate structure 110 may include a brown polycrystalline table 112 attached to an end of a fully sintered substrate 102. In other embodiments, the first intermediate structure 110 may comprise a brown polycrystalline table 112 attached to an end of a brown substrate.

Figure 3:
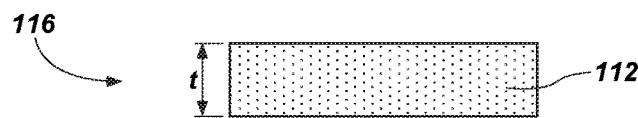
FIG. 3 illustrates a schematic view of another intermediate structure formed in a process for attaching a polycrystalline table to a substrate.

Referring to FIG. 3, another intermediate structure 116 formed in a process for attaching a polycrystalline table to a substrate is shown. The other intermediate structure 116 may comprise the brown polycrystalline table 112 after detaching from the substrate 102 (see FIG. 2). The substrate 102 may be removed by, for example, electric discharge machining (EDM), laser machining, grinding, carbide ultrasonic machining, or other processes for removing a substrate 102 comprising a hard material known in the art. After removal of the substrate 102, the brown polycrystalline table 112 may exhibit sufficient structural strength to retain its shape independent of any external support.

The other intermediate structure 116 may also comprise the brown polycrystalline table 112 after leaching material therefrom. The brown polycrystalline table 112 may be fully leached or substantially fully leached, all or substantially all material other than the superabrasive material of the brown polycrystalline table 112 being removed by a leaching agent. Thus, catalyst material 106 (FIG. 1) and other material removable by a leaching agent, for example, may be leached from the brown polycrystalline table 112. The leaching agent may comprise, for example, aqua regia or other leaching agents known in the art. Prior to leaching, the brown polycrystalline table 112 may comprise, for example, greater than 10% by volume of catalyst material 106 and other material removable by a leaching agent. In some embodiments, the brown polycrystalline table 112 may comprise greater than 15% by volume of catalyst material 106 and other material removable by a leaching agent. The catalyst material 106 and other material removable by a leaching agent may impart greater permeability to the brown polycrystalline table 112, resulting in reduced leaching times.

The brown polycrystalline table 112 may exhibit an enhanced leach rate when compared to a leach rate of a fully sintered polycrystalline table. For example, in an embodiment where the brown polycrystalline table 112 has a thickness t of about 2 mm, the brown polycrystalline table 112 may require less than about two weeks to leach all or substantially all material other than the superabrasive material of the brown polycrystalline table 112 therefrom. Thus, the permeability of the brown polycrystalline table 112 may be equal to or greater than a final permeability of a fully sintered polycrystalline table.

Figure 4:
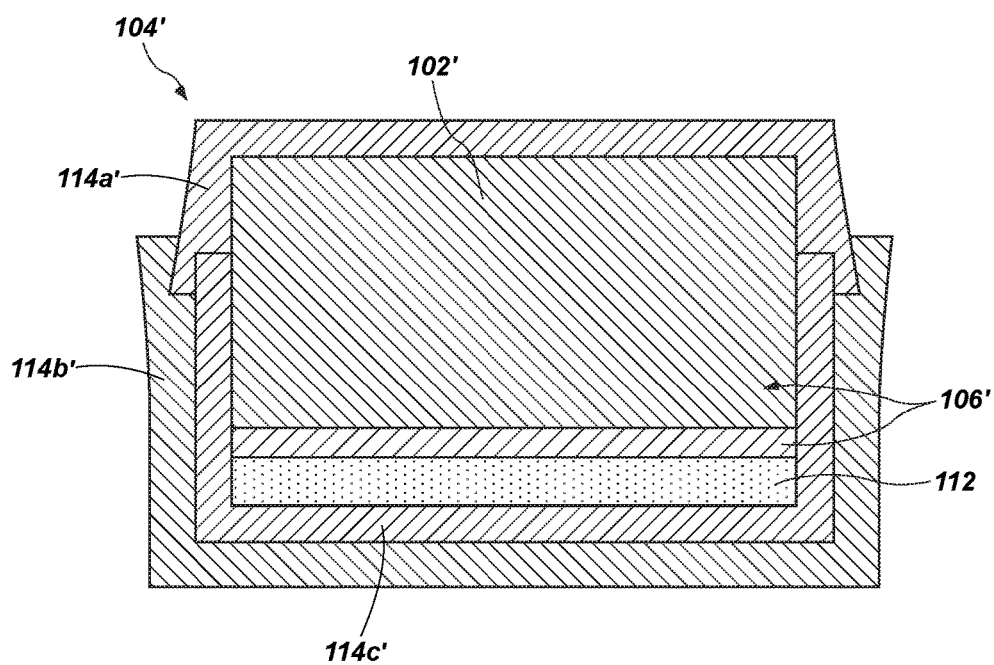
FIG. 4 illustrates a schematic view of a brown polycrystalline table disposed on a substrate in a mold in a process for attaching a polycrystalline table to a substrate.

Referring to FIG. 4, the brown polycrystalline table 112 may be disposed in a mold 104', which may be the same as the mold 104 described previously in connection with FIG. 1 or may be another mold. The brown polycrystalline table 112 may be disposed on an end of a second fully sintered substrate 102'. In other embodiments, the substrate 102' may comprise a green or brown part. The other substrate 102' may comprise a hard material, such as, for example, any of the hard materials described previously in connection with the first substrate 102 shown in FIG. 1. A catalyst material 106' may also be disposed in the mold 104'. For example, a disc, foil, or mesh of catalyst material 106' may be interposed between the brown polycrystalline table 112 and the substrate 102'. Further, catalyst material 106' may be disposed in the substrate 102', such as, for example, where the substrate 102' comprises a cermet material and the metal matrix comprises a catalyst material 106'. The catalyst material 106' may comprise a second catalyst material differing from the first catalyst material 106 used in the processes described in FIGS. 1 and 2, or may comprise the same catalyst material.

The brown polycrystalline table 112 and the substrate 102' may be subjected to a sintering process in the presence of the catalyst material 106' to fully sinter the brown polycrystalline table 112 and attach it to an end of the substrate 102'. The sintering process may be an HTHP process as known in the art. Grain growth of grains of superabrasive material of the brown polycrystalline table 112 may not be minimized during this sintering process. During the sintering process, catalyst material 106' may be swept from the substrate 102' into the brown polycrystalline table 112, filling at least some interstitial spaces between interbonded grains of superhard material.

Referring to FIG. 5, a fully sintered polycrystalline table 124 formed by sintering the brown polycrystalline table 112 (see FIG. 4) is shown. The polycrystalline table 124 is disposed on and attached to an end of a fully sintered substrate 126. Thus, a cutting element 128 comprising a fully sintered polycrystalline table 124 attached to a substrate 126 may be formed. The polycrystalline table 124 may have a final permeability less than the permeability of the brown polycrystalline table 112. The polycrystalline table 124 may comprise interstitial spaces disposed among interbonded grains of superabrasive material, the interstitial spaces comprising less than 10% by volume of the polycrystalline table 124. Some of the interstitial spaces may include catalyst material 106' (FIG. 4) that has migrated from the substrate 126 into the polycrystalline table 124.

The polycrystalline table 124 may be subjected to another leaching process after being attached to the substrate 126. A leaching agent, such as, for example, aqua regia or other leaching agents known in the art, may be used to remove catalyst material 106' (FIG. 4) from the polycrystalline table 124. For example, the polycrystalline table 124 may be leached to a selected depth d extending from a cutting surface 130 of the polycrystalline table 124 toward the substrate 126. The leaching depth d may be less than the total thickness t of the polycrystalline table 124. In some embodiments, the leaching depth d may be less than half the total thickness t of the polycrystalline table 124. In other embodiments, the leaching depth d may be greater than half the total thickness t of the polycrystalline table 124. In still other embodiments, the leaching depth d may be equal to or substantially equal to the total thickness t of the polycrystalline table 124. In some embodiments, catalyst material 106' may also be removed to a radial depth from the radially outer periphery of the polycrystalline table 124. In still further embodiments, the leaching depth d may vary in a radial direction, in an angular direction, or both throughout the polycrystalline table 124. In some embodiments, catalyst material 106' may be removed in a pattern or only from a selected volume within the polycrystalline table 124.

Referring to FIG. 6, a cutting element 128 formed by the process illustrated in FIGS. 1 through 5 is shown. The cutting element 128 may comprise a polycrystalline table 124 disposed on and attached to an end of a substrate 126. The polycrystalline table 124 may comprise a disc and the substrate 126 may comprise a cylinder. Referring to FIG. 7, another cutting element 128' formed by the process illustrated in FIGS. 1 through 5 is shown. The cutting element 128' may comprise a polycrystalline table 124' disposed on and attached to an end of a substrate 126'. The polycrystalline table 124' may comprise a dome shape, such as a hemisphere, and the substrate 126' may comprise a cylinder. In other embodiments, the polycrystalline table and substrate may have other forms, such as, for example, chisel-shaped, tombstone-shaped, or other shapes or forms known in the art.

Figure 8A:
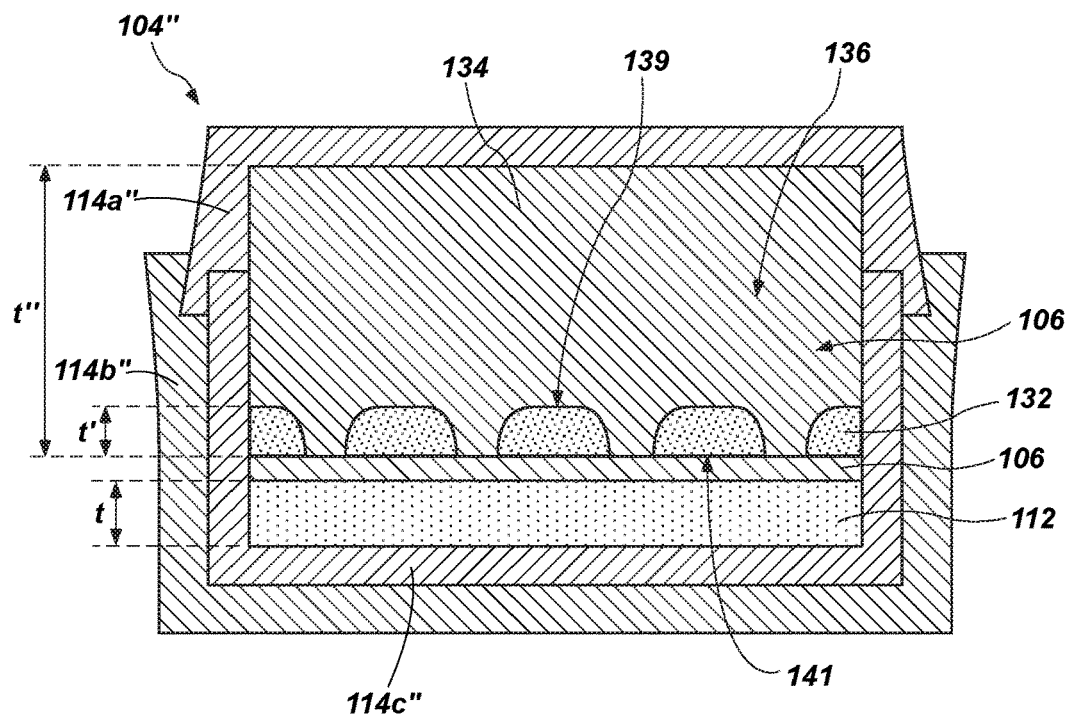
FIG. 8A illustrates a schematic view of a brown polycrystalline table disposed on a fully sintered polycrystalline table attached to a substrate in another embodiment of a process for attaching a polycrystalline table to a substrate.
Figure 8B:
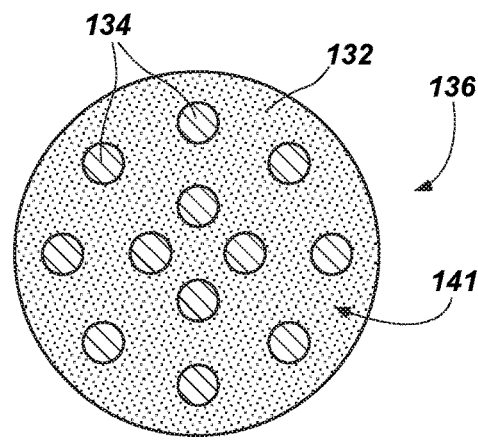
FIG. 8B depicts a top view of the fully sintered polycrystalline table attached to the substrate of FIG. 8A.

Referring to FIGS. 8A and 8B, a brown polycrystalline table 112 disposed on a fully sintered polycrystalline table 132 attached to an end of a substrate 134 is shown. The brown polycrystalline table 112 may be formed using the processes described in connection with FIGS. 1 through 3. The fully sintered polycrystalline table 132 attached to an end of a substrate 134 may be formed as a conventional cutting element 136 using conventional processes known in the art. The fully sintered polycrystalline table 132 may then be ground down to a thickness t' less than its original thickness. In other embodiments, the cutting element 136 may be formed with a reduced overall thickness t" to accommodate the thickness t of the brown polycrystalline table 112. The brown polycrystalline table 112 may be disposed on an end of the fully sintered polycrystalline table 132 opposing the substrate 134 to which it is attached in a mold 104". In some embodiments, catalyst material 106 may be disposed between the fully sintered polycrystalline table 132 and the brown polycrystalline table 112. For example, a foil or disc of catalyst material 106 may be interposed between the fully sintered polycrystalline table 132 and the brown polycrystalline table 112.

An interface 139 between the fully sintered polycrystalline table 132 and the substrate 134 may include a non-planar interface design. For example, the non-planar interface design may comprise a plurality of alternating protrusions and recesses, concentric rings, radially extending spokes, or other non-planar interface designs known in the art. In embodiments where the fully sintered polycrystalline table 132 has been ground to a thickness t' less than its original thickness, portions of the substrate 134 may be exposed at a surface 141 of the fully sintered polycrystalline table 132 opposing the interface 139, as best shown in FIG. 8B. In other embodiments, the non-planar interface design may expose portions of the substrate 134 at a surface 141 of the fully sintered polycrystalline table 132 to which the brown polycrystalline table 112 is to be attached even without grinding. Thus, the non-planar interface design may enable catalyst material 106 present in the substrate 134 to have a more direct flow path from the substrate 134 to the brown polycrystalline table 112.

The brown polycrystalline table 112, the fully sintered polycrystalline table 132, and the substrate 134 may be subjected to a sintering process to fully sinter the brown polycrystalline table 112 and to attach the brown polycrystalline table 112 to the fully sintered polycrystalline table 132. The sintering process may be an HTHP process as known in the art. Grain growth of grains of superabrasive material of the brown polycrystalline table 112 may not be minimized during this sintering process. During the sintering process, catalyst material 106 may be swept from the fully sintered polycrystalline table 132, from the substrate 134, or both, into the brown polycrystalline table 112, filling interstitial spaces between interbonded grains of superabrasive material. In addition, grains of superabrasive material of the brown polycrystalline table 112 may form intergranular bonds with grains of superabrasive material of the fully sintered polycrystalline table 132.

FIG. 9 illustrates a schematic view of a fully formed polycrystalline table 124" attached to a substrate 134. The polycrystalline table 124" may comprise the once-brown polycrystalline table 112 and the fully sintered polycrystalline table 132 after sintering (see FIG. 8A). Because intergranular bonds may have formed between grains of superabrasive material of the once-brown polycrystalline table 112 and grains of superabrasive material of the fully sintered polycrystalline table 132 during the sintering process described above, a boundary 137 therebetween may not be discernable in the polycrystalline table 124". The polycrystalline table 124" is disposed on and attached to the fully formed substrate 134. Thus, a cutting element 128" comprising a polycrystalline table 124" attached to a substrate 134 may be formed. The polycrystalline table 124" may have a final permeability less than the permeability of the brown polycrystalline table 112. The polycrystalline table 124" may comprise interstitial spaces disposed among interbonded grains of superabrasive material, the interstitial spaces comprising less than 10% by volume of the polycrystalline table 124". Some of the interstitial spaces may include catalyst material 106 (FIGS. 1 and 8A) that has migrated from the fully sintered polycrystalline table 132 and the substrate 134 into the polycrystalline table 124".

The polycrystalline table 124" may be subjected to another leaching process after being attached to the substrate 134. A leaching agent, such as, for example, aqua regia or other leaching agents known in the art, may be used to remove catalyst material 106 (FIGS. 1 and 8A) from the polycrystalline table 124". The polycrystalline table 124" may be leached to a selected depth d extending from a cutting surface 130' of the polycrystalline table 124" toward the substrate 134. The leaching depth d may be less than the total thickness t and t' of the polycrystalline table 124". In some embodiments, the leaching depth d may be less than half the total thickness t and t' of the polycrystalline table 124". In other embodiments, the leaching depth d may be greater than half the total thickness t and t' of the polycrystalline table 124". In other embodiments, the leaching depth d may be at least substantially equal to the portion of the polycrystalline table 124" formed from the once-brown polycrystalline table 112, and, therefore, at least substantially equal to the thickness t of the brown polycrystalline table 112. In still other embodiments, the leaching depth d may be equal to or substantially equal to the thickness t and t' of the polycrystalline table 124". As noted above, radially inward leaching from the side of the polycrystalline table 124" may also be conducted.

In some embodiments, the fully sintered polycrystalline table 132 may be selected to have a low permeability. For example, the fully sintered polycrystalline table 132 may include a microstructure as described in U.S. patent application Ser. No. 13/040,921, filed Mar. 4, 2011, titled "POLYCRYSTALLINE TABLES, POLYCRYSTALLINE ELEMENTS, AND RELATED METHODS" to Lyons et al., the disclosure of which is hereby incorporated herein in its entirety by this reference. For example, the fully sintered polycrystalline table 132 may have a low permeability exhibiting, for a thickness t' of 2 mm, a leach rate of greater than about five weeks to substantially completely remove catalyst material from the fully sintered polycrystalline table 132. In embodiments where the fully sintered polycrystalline table 132 has a low permeability, the portion of the polycrystalline table 124" formed from the fully sintered polycrystalline table 132 may act as a barrier to the leaching agent during leaching of the polycrystalline table 124". Thus, the flow of the leaching agent through the polycrystalline table 124" may be impeded by the portion of the polycrystalline table 124" formed from the fully sintered polycrystalline table 132 having a low permeability. To ensure adequate catalyzing of the brown polycrystalline table 112 (see FIGS. 8A and 8B) in embodiments where the fully sintered polycrystalline table 132 has a low permeability, catalyst material 106 may be disposed between the brown polycrystalline table 112 and the fully sintered polycrystalline table 132. In addition or in the alternative, a non-planar interface design may expose portions of the substrate 134 at a surface 141 of the fully sintered polycrystalline table 132 to which the brown polycrystalline table 112 is to be attached to provide a more direct flow path for catalyst material 106 to flow from the substrate 134 to the brown polycrystalline table 112.

Referring to FIG. 10, a cutting element 128" formed by the process illustrated in FIGS. 8A, 8B, and 9 is shown. The cutting element 128" may comprise a polycrystalline table 124" disposed on and attached to an end of a substrate 134. The polycrystalline table 124" may comprise a disc and the substrate 134 may comprise a cylinder. Referring to FIG. 11, another cutting element 128''' formed by the process illustrated in FIGS. 8A, 8B, and 9 is shown. The cutting element 128''' may comprise a polycrystalline table 124''' disposed on and attached to an end of a substrate 134. The polycrystalline table 124''' may comprise a dome shape, such as a hemisphere, and the substrate 134 may comprise a cylinder. In other embodiments, the polycrystalline table and substrate may have other forms, such as, for example, chisel-shaped, tombstone-shaped, or other shapes or forms known in the art.

Figure 12:
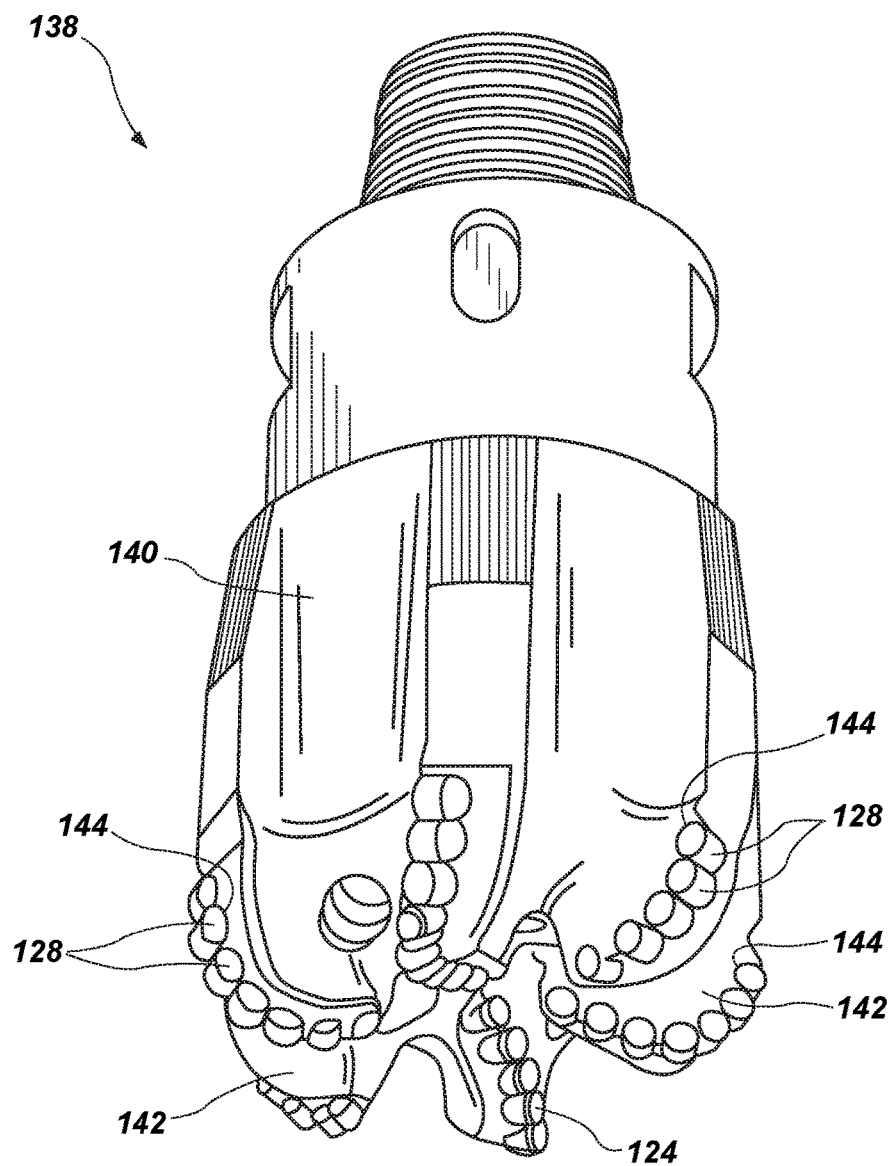
FIG. 12 is a perspective view of an earth-boring drill bit having cutting elements attached thereto.

Referring to FIG. 12, a perspective view of an earth-boring drill bit 138 having cutting elements 128 (e.g., cutting elements 128, 128', 128", 128''' described previously in connection with FIGS. 6, 7, 10, and 11), attached thereto, at least one cutting element 128 having a polycrystalline table 124 of the present disclosure. The earth-boring drill bit 138 includes a bit body 140 having blades 142 extending from the bit body 140. The cutting elements 128 may be secured within pockets 144 formed in the blades 142. However, cutting elements 128 and polycrystalline tables 124 as described herein may be bonded to and used on other types of earth-boring tools, including, for example, roller cone drill bits, percussion bits, core bits, eccentric bits, bicenter bits, reamers, expandable reamers, mills, hybrid bits, and other drilling bits and tools known in the art.

While the present invention has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

What is claimed is:
1. An intermediate structure formed during a process of attaching a polycrystalline table to a substrate, comprising:
   a substantially fully leached brown polycrystalline table, the substantially fully leached brown polycrystalline table comprising a plurality of interbonded grains of a superabrasive material;

wherein the substantially fully leached brown polycrystalline table comprises greater than 10% by volume of interstitial spaces among the interbonded grains of the superabrasive material.

2. The intermediate structure of claim 1, wherein the substantially fully leached brown polycrystalline table exhibits sufficient strength to retain a shape thereof independent of external structural support.

3. The intermediate structure of claim 1, further comprising:
a substrate comprising a hard material and having an end to which the substantially fully leached brown polycrystalline table is attached.

4. The intermediate structure of claim 1, wherein a grain growth exhibited by the plurality of interbonded grains in the substantially fully leached brown polycrystalline table is 5 μm or less when compared to the size of the grains before interbonding.

5. The intermediate structure of claim 1, further comprising a fully sintered polycrystalline table comprising a plurality of interbonded grains of a superabrasive material, the fully sintered polycrystalline table located adjacent to the substantially fully leached brown polycrystalline table.

6. The intermediate structure of claim 5, wherein the fully sintered polycrystalline table is attached to a substrate.

7. The intermediate structure of claim 6, wherein portions of the substrate are exposed at a surface of the fully sintered polycrystalline table, the portions of the substrate being located adjacent to the substantially fully leached brown polycrystalline table.

8. The intermediate structure of claim 1, wherein the substantially fully leached brown polycrystalline table exhibits, for a thickness of about 2 mm, a leach rate of less than about two weeks to substantially completely remove catalyst material from an unleached brown polycrystalline table to form the substantially fully leached brown polycrystalline table.

9. A cutting element for an earth-boring tool, comprising:
a substrate comprising a particle-matrix composite material; and
a table of superabrasive, polycrystalline material attached to an end of the substrate;
wherein a first portion of the table includes a non-planar interface design at an interface between the table and the substrate, such that a plane at least substantially horizontal to a longitudinal axis of the cutting element intersects with the particle-matrix composite material of substrate and the superabrasive, polycrystalline material of the table within the first portion, and a second portion of the table extending from the non-planar interface design away from the substrate and the first portion is free of particles of the particle-matrix composite material of the substrate;
wherein a leach rate of the first portion of the table is less than a leach rate of the second portion of the table; and
wherein catalyst material extends directly from the matrix of the particle-matrix composite material of the substrate into interstitial spaces among interbonded particles of the superabrasive, polycrystalline material of the second portion of the table via the non-planar interface design.

10. The cutting element of claim 9, wherein a volume percentage of the metal matrix material in the first portion of the table is greater than a volume percentage of the metal matrix material in the second portion.

11. The cutting element of claim 10, wherein the volume percentage of metal matrix material in the second portion is less than 10%.

12. The cutting element of claim 11, wherein the volume percentage of metal matrix material in the second portion is at least substantially 0%.

13. The cutting element of claim 9, wherein the non-planar interface design comprises one of: a plurality of alternating protrusions and recesses of the particle-matrix composite material of the substrate and of the superabrasive, polycrystalline material of the table; alternating concentric rings of the particle-matrix composite material of the substrate and of the superabrasive, polycrystalline material of the table; or radially extending spokes of the particle-matrix composite material of the substrate extending into corresponding recesses formed by the superabrasive, polycrystalline material of the table.

14. The cutting element of claim 9, wherein the leach rate of the first portion is, for a thickness of about 2 mm, about five weeks to substantially completely remove catalyst material from the first portion.

15. The cutting element of claim 9, wherein a cutting face of the table is at least substantially planar.

16. The cutting element of claim 9, wherein a cutting face of the table is non-planar.

17. The cutting element of claim 16, wherein the cutting face of the table exhibits one of a dome, hemisphere, chisel, and tombstone shape.

* * * * *